(No Model.)

G. A. JOHNSON.
BICYCLE BRAKE.

No. 591,974. Patented Oct. 19, 1897.

Witnesses
J. C. Shaw
Chas. E. Brock

Inventor
G. A. Johnson,
by O'Meara & Co.
Attorneys

UNITED STATES PATENT OFFICE.

GEORGE ADELBERT JOHNSON, OF TRAVERSE CITY, MICHIGAN.

BICYCLE-BRAKE.

SPECIFICATION forming part of Letters Patent No. 591,974, dated October 19, 1897.

Application filed August 24, 1896. Serial No. 603,750. (No model.)

*To all whom it may concern:*

Be it known that I, GEORGE ADELBERT JOHNSON, residing at Traverse City, in the county of Grand Traverse and State of Michigan, have invented a new and Improved Bicycle-Brake, of which the following is a specification.

This invention relates generally to bicycles, and more particularly to an improved bicycle-brake. Heretofore the brake has generally been applied to the tread of the pneumatic tire, but this has been found very objectionable, inasmuch as it injures the tire, and for this reason a large majority of bicyclists dispense entirely with the use of the brake. Other brake devices applied to the hub, and sometimes to the drive-chain, have been devised, but they are more or less complicated and not so efficient as a brake applied to the tread of the wheel.

The object of my invention, therefore, is to avoid the objection of throwing the brake upon the tread of the pneumatic tire, and at the same time I propose to apply the brake where it will be the most efficient; and with this object in view my invention consists, essentially, in placing an annular rim upon one or both sides of the wheel-rim which projects laterally outward from said wheel-rim, and upon which the brake-shoe can bear, thereby retarding the motion of the wheel and at the same time avoiding contact with the tread of the tire.

My invention consists also in certain details of construction and novelties of combination, all of which will be fully described hereinafter, and pointed out in the claim.

Figure 1:
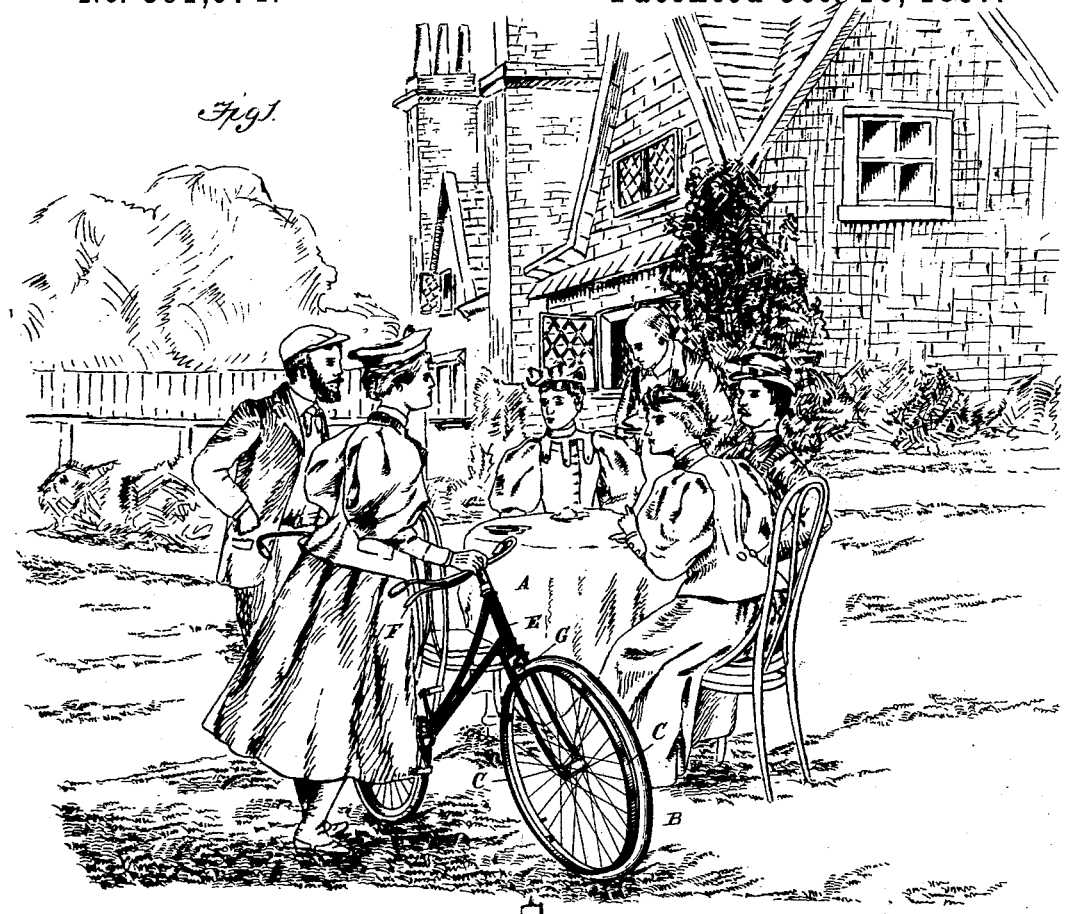
Figure 2:
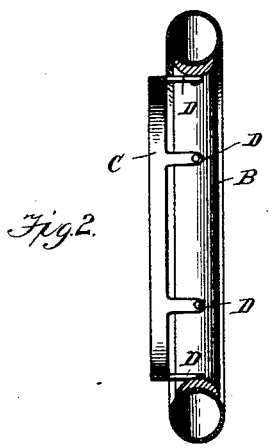
Figure 3:
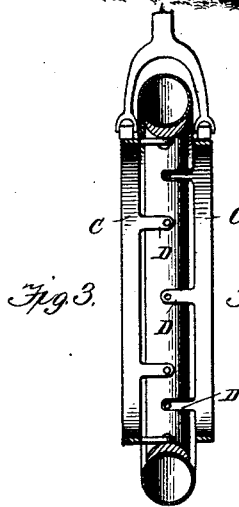
Figure 4:
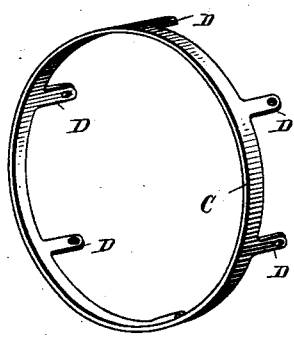
Figure 5:
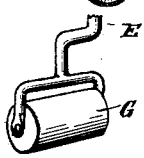

In the drawings forming a part of this specification, Figure 1 is a view showing my invention in use. Fig. 2 is a detail sectional view of the wheel provided with my improvement. Fig. 3 is a similar view showing the rim arranged upon each side of the wheel. Fig. 4 is a detail view of the brake-rim detached.

Referring now to the drawings, A indicates the bicycle, which may be of any desired construction, and in which the front wheel B is equipped, but it will of course be understood that the rim may be of any desired material and that the tire can be of any desired construction.

Attached to the rim is an annular brake C, which projects laterally outward from the wheel-rim and is provided with a series of inwardly-projecting lugs D, by means of which the said annular brake-rim is attached to the inner face of the wheel-rim between the spokes.

The brake-rod E, operated by the lever F, carries a shoe G at its lower end, which may be in the nature of a roller or a block, as preferred, said brake-shoe bearing directly upon the brake-rim C and retarding the motion of the wheel.

The brake-rim C is preferably constructed of metal and may be nickel-plated or japanned, as desired, and I therefore prefer to cover the brake-shoe with rubber or some similar material to prevent scratching or injuring the brake-rim.

It will thus be seen that I provide a brake device which is equally efficient with the brake, applied directly to the tread of the tire, but avoids the objectionable feature of so applying the brake.

The device as thus far described can be applied to any of the bicycles now in use without adding any appreciable weight thereto, and if desired a brake-rim can be arranged upon each side of the wheel and the lower end of the brake-rod can be forked to straddle the tire and carry a shoe at each end. In this instance, however, the fork would probably have to be widened a trifle in order to accommodate the extra rim. This, however, would be a matter of small importance compared with the great advantage of having a brake device upon the periphery of the wheel and independent of the pneumatic tire.

Having thus described my invention, what I claim as new, and desire to secure by Letters Patent, is—

A bicycle consisting of the usual frame and wheels, the brake-lever, brake rod and shoe, and a rim to receive the contact of the brake provided with laterally-projecting lugs D, whereby it is attached to the inner face of the rim of the wheel, the brake lever and shoe being adapted to coact with said brake-rim, for the purpose set forth.

GEORGE ADELBERT JOHNSON.

Witnesses:
JOHN W. PATCHIN,
JOHN A. LORANGER.